US006875959B1

(12) United States Patent
Ciejek

(10) Patent No.: US 6,875,959 B1
(45) Date of Patent: Apr. 5, 2005

(54) FOOD STEAMER

(76) Inventor: Edward Ciejek, 213 Captain Newport Cir., Williamsburg, VA (US) 23185

( * ) Notice: Subject to any disclaimer, the term of this patent is extended or adjusted under 35 U.S.C. 154(b) by 0 days.

(21) Appl. No.: 10/788,540

(22) Filed: Feb. 27, 2004

(51) Int. Cl.⁷ ............................. A47J 27/04; A47J 27/22
(52) U.S. Cl. ...................... 219/430; 219/394; 219/401; 99/416; 126/20.2
(58) Field of Search ................................. 219/401, 394, 219/428, 430, 439; 126/20.2, 20, 20.1; 99/416, 411–415, 448

(56) References Cited

U.S. PATENT DOCUMENTS

| 590,212 A | * | 9/1897 | Daesch ........................ 99/416 |
| 1,630,787 A | * | 5/1927 | Cullen ........................ 99/416 |
| 2,223,432 A | | 12/1940 | Smith |
| 2,522,152 A | * | 9/1950 | Wilson ........................ 99/416 |
| 2,807,995 A | * | 10/1957 | Petty ............................ 99/415 |
| 3,861,286 A | * | 1/1975 | Albright et al. ............. 99/327 |
| 4,646,628 A | * | 3/1987 | Lederman .................... 99/416 |
| 4,817,512 A | | 4/1989 | Vangen |
| 5,275,094 A | | 1/1994 | Naft |
| D376,067 S | | 12/1996 | Littmann |
| D395,787 S | | 7/1998 | Wilks |
| 5,865,098 A | | 2/1999 | Anelli |
| 6,035,766 A | | 3/2000 | Schirmer |
| 6,259,068 B1 | | 7/2001 | Barrow |
| 2003/0010767 A1 | | 1/2003 | Li |

* cited by examiner

Primary Examiner—Joseph Pelham
(74) Attorney, Agent, or Firm—Lawrence J. Gibney, Jr.

(57) ABSTRACT

This will allow a consumer to steam food in more than one container at the same time. It will allow the food preparer to specifically time those items depending on the type of food that is being steamed.

9 Claims, 4 Drawing Sheets

FOOD STEAMER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

This relates to preparation of food using a steamer and specifically a steamer with multiple compartments.

B. Prior Art

A variety of other similar patents dealing with steaming foods exist in the prior art.

They generally involve a level base, which houses the heating element(s) and a tray or bowl of water to steam or prepare the food. Ventilation holes are at the top of the steamer for ventilation.

A representative example of the prior art is the Naft U.S. Pat. No. 5,275,094, which includes the base, boiling liquid reservoir, heating element and cooking utensil. However, patents such as Naft are structurally and functionally different from the present invention.

Other representative patents in this particular area are Anelli, U.S. Pat. No. 5,865,908 and Barrow, U.S. Pat. No. 6,259,068. None of these patents, which are representative of the prior art, specifically solve the problem of steaming multiple foods at the same time in one device.

This particular device seeks to address the concern where an individual can steam and prepare multiple food products in one unit. This would increase the efficiency and general utility of a food steamer for household use.

BRIEF SUMMARY OF THE INVENTION

This invention is capable of steaming different types and amounts of foods such as vegetables in one unit using separate containers.

The device has four separate food containers. Each of the containers is identically shaped and easily interchangeable. Separate timers and separate heating elements for the containers control the process of cooking the food in the respective container.

A separate handle is provided for each container and is used for each section as well as separate ventilation valves for each particular compartment. In this device the steamer is circular and each container occupies approximately ninety degrees of the circle.

The device would allow the individual to steam one vegetable in one compartment for a designated period of time and a different vegetable for a different period of time in a separate compartment.

It is the object of this device to allow multiple types of foods to be steamed at the same time with one device. Other objects of this device, which are not specifically mentioned, will be apparent by the description of the device in this application.

DETAILED DESCRIPTION OF THE EMBODIMENTS

Figure 1:
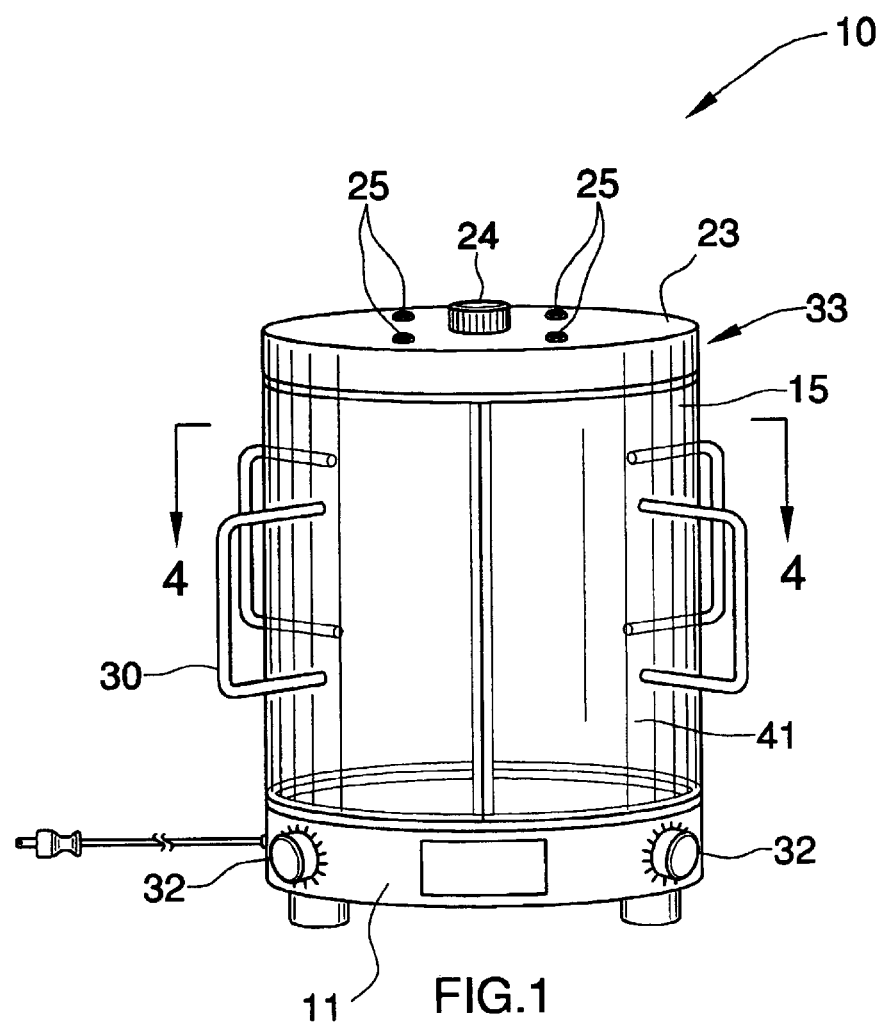
FIG. 1 is a front view of the device showing the elements of the device.

This device 10 is a cooking utensil, which has a base 11, four separate steaming containers 15, and a top section 33. FIG. 1 shows a front view of the device showing all visible parts of the machine and the base 11 which is slightly elevated.

The device can be elevated by using a means of elevation such as is represented in FIG. 1.

The device 10 rests on a base 11, which is circular. This device 10 is approximately sixteen to eighteen inches high, and has an eighteen inch diameter. The containers 15, which are of equal size, rest on the top surface of the base 11. The containers fit on the top surface of the base 11 and under the space for the top section 33.

Figure 2:
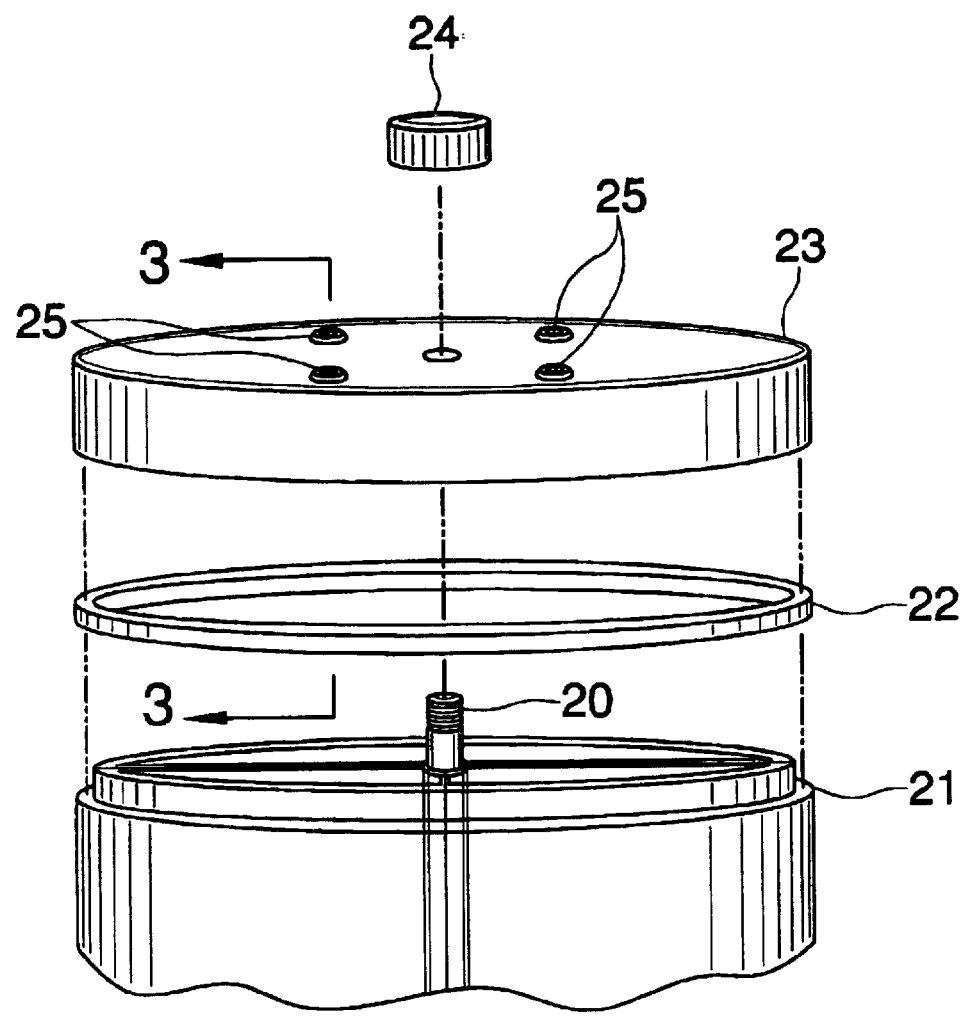
FIG. 2 is an exploded view of the top of the device.
Figure 4:
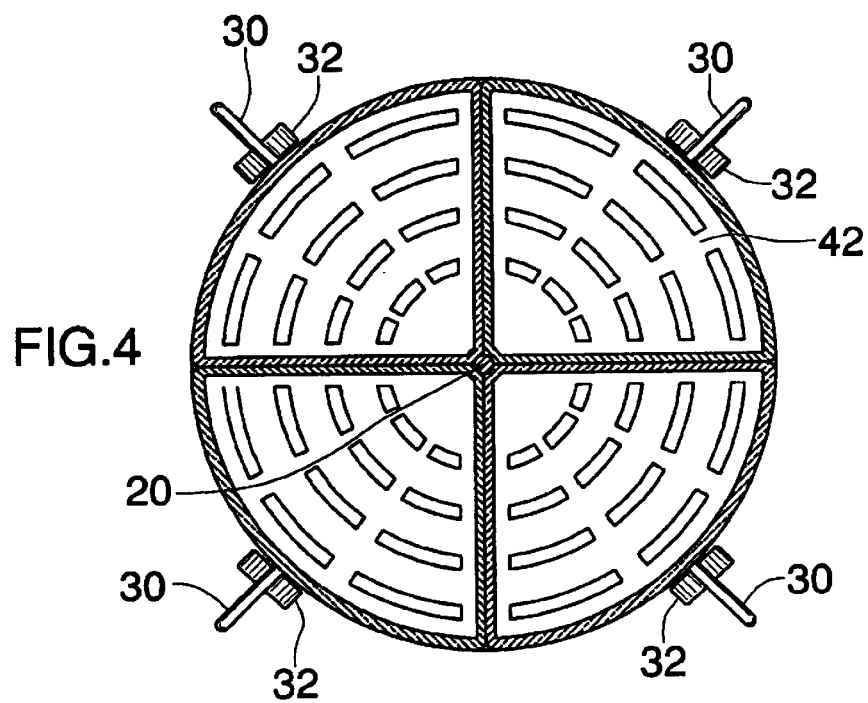
FIG. 4 is a cross sectional view according to line 4—4 on FIG. 1.
Figure 5:
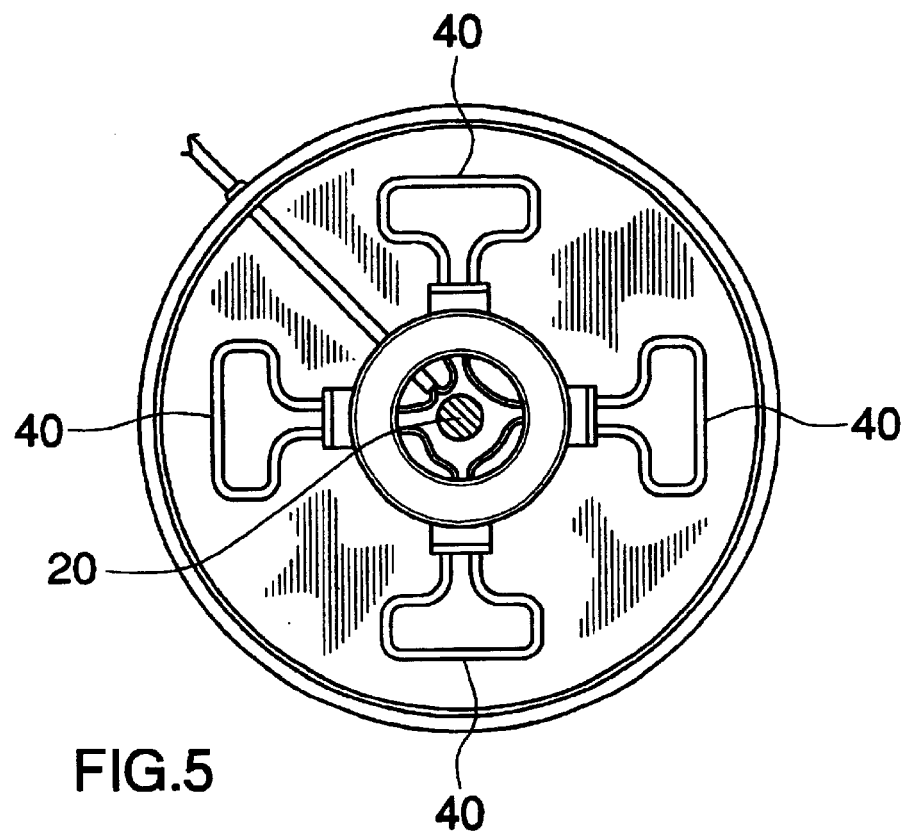
FIG. 5 is a top view of the base of the device.
Figure 6:
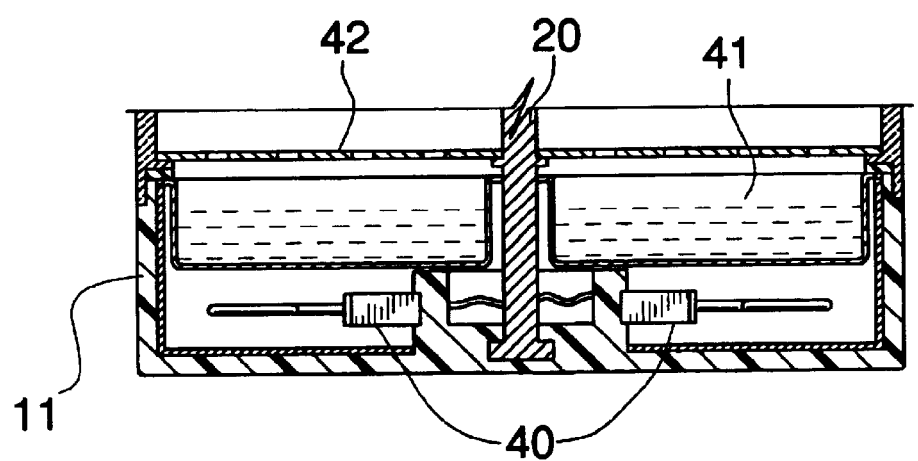
FIG. 6 is a cross sectional view of the base of the device.

In the center of the device is a rod 20, which is secured in the base 11 of the device and extends vertically the entire height of the device. FIGS. 4, 5, 6 The rod 20 is threaded on one end to provide a means to secure the top section 33 to the rest of the device and maintain the proper position of the separate containers. FIG. 2 depicts the means to secure the top section 33 of the device to the top of the threaded rod 20.

A recessed lip 21 on the top surface of the top section 33 of the device accommodates the upper seal 22, which is used to seal the device at the top. FIG. 2.

The top section 33 of the device 10 is equipped with a hole in the center of the top section 33 through which the rod 20 passes. FIG. 2A tightening mechanism 24 such as a nut, wing nut or other type of locking device secures the top section 33 to the remainder of the device. FIG. 2.

Figure 3:
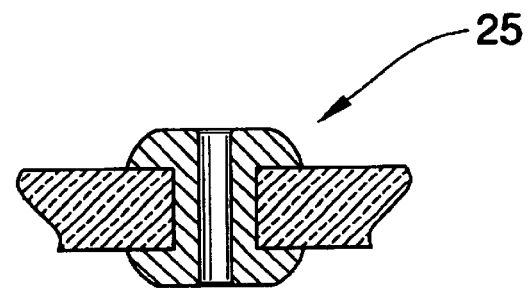
FIG. 3 is a cross sectional view according to line 3—3 on FIG. 2.

According to FIGS. 1, 2 and 3, valves 25 are located on the top section 33 of the device to allow the steam to exit the respective containers 15. Separate valves 25 are used for each container 15 so that the steam may escape from the respective container. FIGS. 1, 2, 3.

The four steaming containers 15, are positioned on the top of the base 11 and the underside of the top section 33. The containers 15 extend radially from the threaded rod 20 and occupy approximately ninety degrees of the circle formed by this device. FIGS. 1, 2.

A separate handle 30 is included on the side of each container 15 so that a particular steaming container 15 may be removed without having to remove all the other containers 15. The handles 30 are identically shaped and extend perpendicularly from the approximate middle of each steaming container 15. FIGS. 1, 4.

According to FIGS. 1 and 4 timers 32 are positioned to properly time each particular section in terms of each cooking need. These timers 32 operate independently of each other and may be set on different times depending on a different food need.

FIG. 4 is a cross section of the device as shown from the top, and shows the threaded rod 20 and the area occupied by each of the steaming containers 15 and the handles 30. FIG. 4 depicts each container 15 into four equal sections of this device 10.

FIGS. 5 and 6 show the elements involved in the base 11 of this device. In order to steam the vegetables there must be some steamed produced. Therefore, a separate tray of water 41, FIG. 6, is included for each section and a separate heating element 40 and timer 32 is included per section. FIGS. 4, 5, 6.

On the bottom of the base 11 are heating elements 40, which may be electric or gas. FIG. 5 Separate heating element 40 are installed for each steaming container 15.

The purpose of the heating element 40 as shown in FIG. 5 is to heat the water in the water reservoir 41, FIG. 6, which is located above the respective heating element 40 and placed between the burner and the grate 42, which holds the food. FIGS. 4, 6 The vegetable is placed on the grate 42 above the water reservoir. FIG. 4 The grate 42 is equipped with slats or grooves as shown in FIG. 4 to allow the steam to fill the respective steaming container and cook the vegetables but prevents the food from entering the water reservoir 41. FIG. 6.

The rod 20 is installed to run from the top to the bottom of the device down the center of the device. According to FIG. 6 one end of the rod 20 is secured to the base 11. The rod 20 may be included as part of a molded base 10 or inserted through a separate hole in the center of the base 11.

It is anticipated that the base 11, the steaming containers 15, and the top section 33 will be constructed from hard plastic and will be non-ferrous to avoid corrosion. The grate 42 and rod 20 may be made from aluminum or some other non-ferrous metal.

What is claimed is:

1. A device in which to steam food comprising a base, four steaming containers, heating elements, timers, a top section, a power source, and heating means;

the separate steaming containers are placed in an upright fashion on the base and fit under the space for the top section;

the top section is equipped with four valves;

a rod, which is secured to the base of the device at the first end and threaded at the second end secures the parts of the device;

separate heating elements and timers are provided for each steaming container.

2. The top section as described in claim 1, wherein there is a valve in the top section for each steaming container.

3. The device as described in claim 1, wherein the rod is molded as part of the base.

4. The device as described in claim 1, wherein separate timers are installed for each separate compartment.

5. The device as described in claim 1, wherein separate heating means is installed for each separate compartment.

6. The heating means as described in claim 5, wherein the heating means is a gas burner.

7. The heating means as described in claim 5, wherein the heating means is an AC circuit.

8. The device as described in claim 1, wherein the materials are non-corrosive.

9. The device as described in claim 1, wherein the materials are hard plastic.

\* \* \* \* \*